Aug. 25, 1959 W. McADAM ET AL 2,901,563

NEGATIVE FEEDBACK AMPLIFIERS

Filed Sept. 9, 1958 3 Sheets-Sheet 1

United States Patent Office 2,901,563
Patented Aug. 25, 1959

2,901,563

NEGATIVE FEEDBACK AMPLIFIERS

Will McAdam, Blue Bell, and John H. Moore, Havertown, Pa., assignors to Leeds and Northrup Company, Philadelphia, Pa., a corporation of Pennsylvania Application September 9, 1958, Serial No. 760,035

14 Claims. (Cl. 179—171)

Figures 1, 1A:
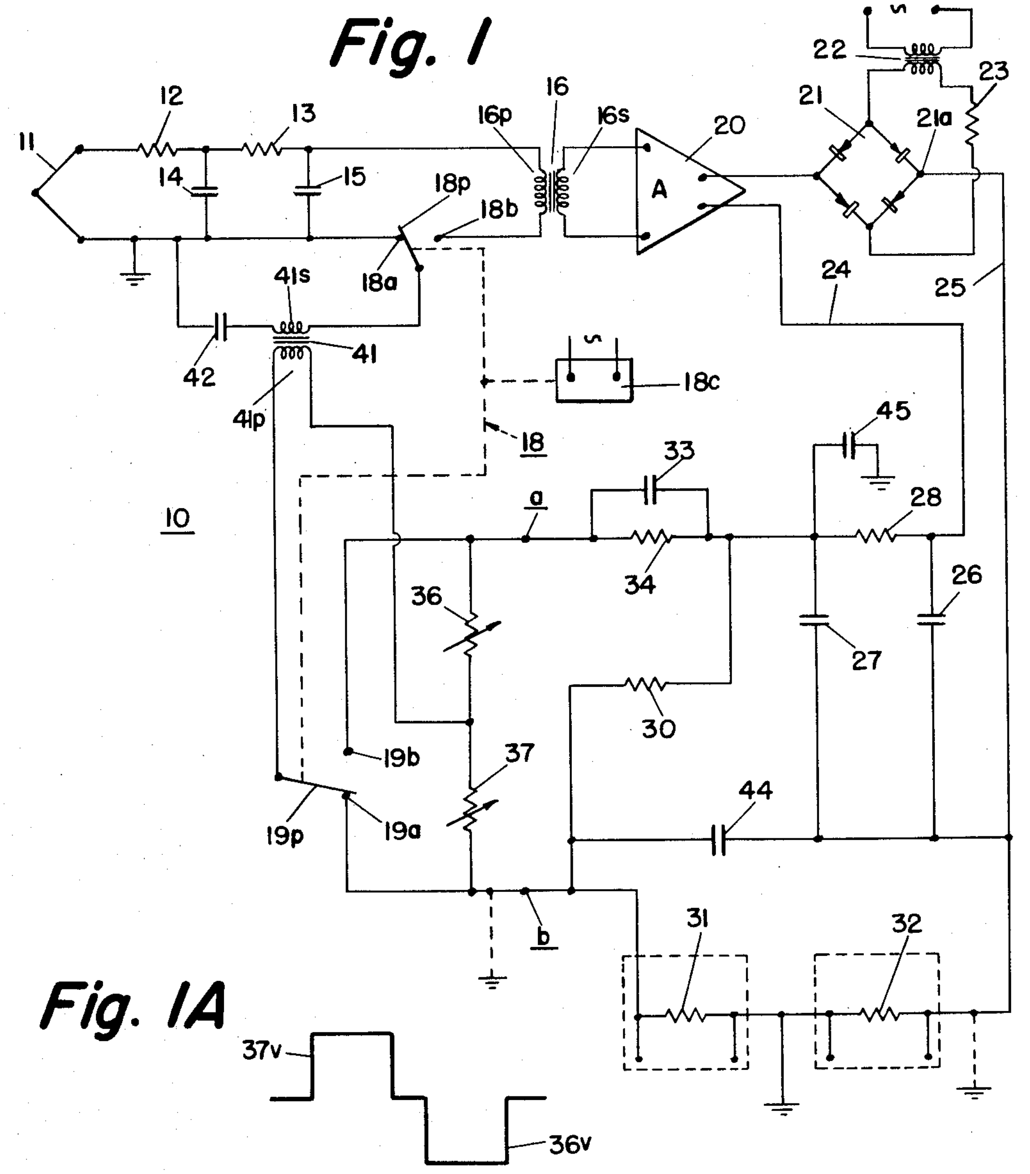

This invention relates to amplifying systems of the type utilizing negative feedback for stabilizing the gain and has for an object the provision of a means for producing direct-current negative feedback for the amplifier through a transformer-coupled circuit.

There have heretofore been utilized alternating-current amplifiers which include converters in the input circuit for transforming a direct-current input signal into an alternating-current input potential for the amplifier. The output from such an amplifier has then been rectified and, as direct current, fed back to the input circuit through a conductively coupled circuit to provide negative feedback for stabilizing the operation of the amplifier.

Difficulties have arisen in the use of amplifiers of the foregoing type, particularly when the input and output circuits, though conductively connected together, are also separately connected to different "ground" points which may differ in potential one from the other. As a result of the differing potential between the so-called "ground" points, ground currents flow. These currents introduce error since the presence of any ground current in the feedback or input circuits will change the output due to its effect upon the magnitude of the effective negative feedback and/or upon the input signal.

It is an object of the present invention to retain the advantages of negative feedback for stabilization of the gain of the amplifier with avoidance of conductive coupling between the input and output circuits. More particularly, impedance elements of the non-conductive type are utilized in the input and output circuits which in conjunction with converters transform the direct-current input signals and the direct-current output signals into alternating current. The alternating current resulting from conversion of the output direct current is then reconverted into direct current by means of one of the converters and applied to the input circuit with a polarity opposing that of the direct-current input signal.

In carrying out the invention in one form thereof, the impedance elements of the non-conductive type comprise transformers having single-pole, double-throw converters associated with each primary winding thereof. By means of a first converter there is applied thereto an error signal of the pulse-type. The error signal has a magnitude and polarity dependent upon the difference and the direction of the difference between an input signal and the direct-current feedback signal. There is produced in the secondary winding of the transformer an alternating current which is amplified, rectified, and by means of a second converter converted to an alternating current which is applied to the primary winding of a feedback transformer. The secondary winding of the feedback transformer is connected to the first converter which rectifies the alternating current from the secondary of the transformer and introduces it into the input as a direct-current feedback signal. In this manner, there is provided the direct-current feedback through a transformer-coupled circuit. Thus, the first converter functions concurrently, that is, synchronously, to rectify the alternating current appearing at the secondary winding of the feedback transformer and to provide the pulse-type of input signal to the primary winding of the input transformer.

Further in accordance with the invention, the operation is made independent of the relative duration of the alternate half-cycles of the alternating-current potentials respectively applied to the input circuit of the amplifier and applied to the converter in the input circuit. Stated differently, the feedback potential is effectively made independent of converter-contact time.

Figure 1B:
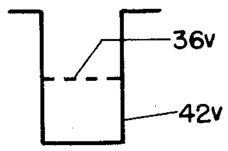
Figure 1C:
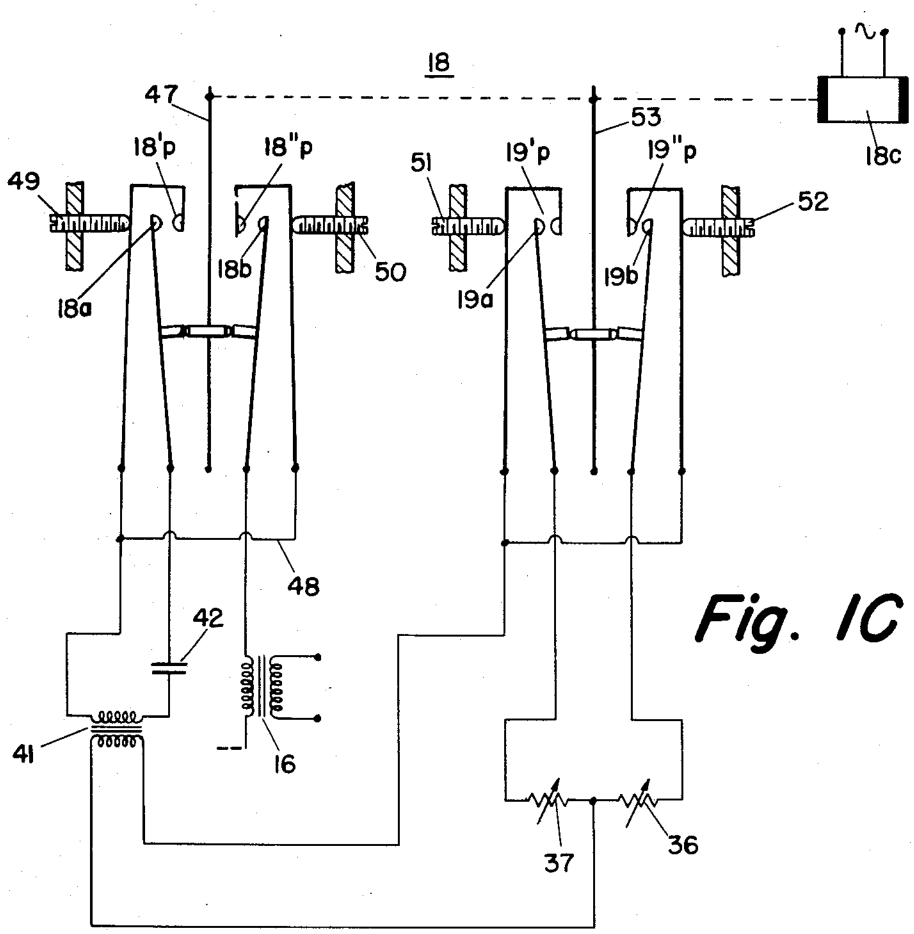
Figure 1D:
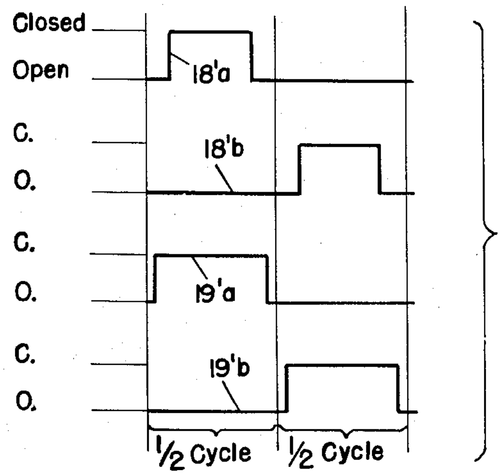
Figures 2, 2A:
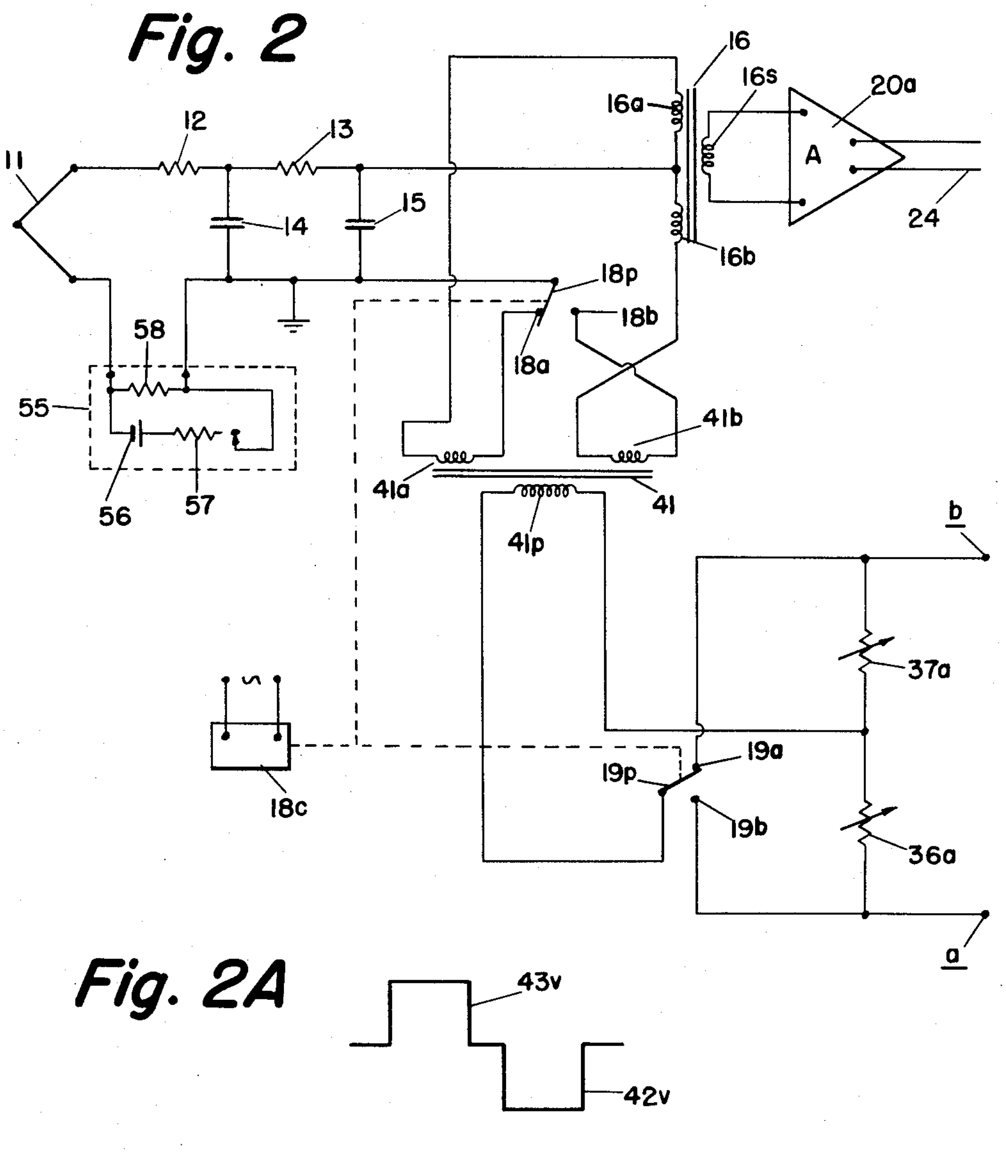
Figure 2B:

For further objects and advantages of the invention and for a detailed disclosure of typical embodiments, reference is to be had to the following description taken in conjunction with the accompanying drawings, in which:

Fig. 1 schematically illustrates, in part by block diagram, an embodiment of the invention;

Figs. 1A, 1B and 1D are diagrams explanatory of the operation of the system of Fig. 1;

Fig. 1C schematically illustrates the synchronized converters of Fig. 1 and includes a fractional part of the wiring diagram of Fig. 1;

Fig. 2 diagrammatically illustrates a further embodiment of the invention, there being illustrated in Fig. 2 only that part of the circuit which differs from Fig. 1; and Figs. 2A and 2B are diagrams explanatory of the operation of the system of Fig. 2.

Referring to the drawings, the invention in one form has been shown in Fig. 1 as applied to an amplifying system 10 for direct-current input potentials, such for example, as developed by thermocouple 11. The direct-current potential of thermocouple 11 is applied by way of a filter circuit including resistors 12 and 13 and capacitors 14 and 15 to a primary winding 16*p* of a transformer 16. The direct-current input is converted to alternating current by operation of a converter of the single-pole, double-throw type, specifically by operation of the single pole 18*p* between its double-throw contacts 18*a* and 18*b*. This converter, as will later be explained, concurrently performs the function of introducing into the input circuit a negative feedback voltage so that any current which flows through the primary winding 16*p* of transformer 16 will be due to the difference between the applied input potential from thermocouple 11 and that fed back by way of the converter 18. Pulsating current flow in the primary winding 16*p* produces alternating current in the secondary winding 16*s*. The secondary winding 16*s* of transformer 16 forms part of the input circuit of a high-gain alternating-current amplifier 20 having connected in its output circuit rectifying means 21 which, although illustrated in the form of a closed circuit bridge, functions as a half-wave rectifier. Thus, the alternating-current output from amplifier 20 is applied across one diagonal of the bridge, while the secondary winding of a control transformer 22 develops across the opposite diagonal of the rectifier bridge an alternating-current voltage which controls the conductivity of the bridge. The primary winding of transformer 22 is connected to the same alternating-current source as supplies the operating coil 18*c* of the converter 18. Thus, the alternating-current control or reference voltage applied to the rectifier 21 alternately blocks and provides transmission therethrough of alternate half-cycles forming the output from amplifier 20. The output of the half-wave rectifier 21 will be considered positive when the output of the terminal 21*a* directly connected to the rectifier has a net positive value, and the output of rectifier 21 will be negative when terminal 21*a* has a net negative value.

Since the operating coil 18*c* and the transformer 22 are energized from the same source of alternating-current supply, there will be a definite phase relation between the alternating current at the output of amplifier 20 and that supplied by transformer 22. That phase relation preferably should be such that the alternating-current output from amplifier 20, as produced by the converter 18, will exactly coincide in phase with, or will be of exact opposite phase to, the control or reference voltage from transformer 22. Phase-adjusting circuits are well understood by those skilled in the art and, therefore, have not been illustrated. Such a phase-adjusting network will ordinarily be connected in circuit with the operating coil 18*c*. Those skilled in the art also understand the operation of the rectifying means 21 under the control of its associated alternating-current transformer 22. Briefly, there is included in the secondary winding a limiting resistor 23 to limit the flow of current during each conducting half-cycle through the diodes comprising the bridge which may also be referred to as a rectifier ring. Assuming the left-hand side of the secondary winding of transformer 22 to be positive, it will be seen that current will flow through all four diodes of bridge 21, returning to the other side of the secondary winding by way of resistor 23. With all four diodes conductive, the bridge 21 forms a low impedance element in series in the output circuit of amplifier 20. With reversal of the polarity of the output of the secondary winding of transformer 22, no current will flow through the bridge 21 due to the unidirectional current-conducting characteristics of the diodes of the bridge. Accordingly, with the bridge 21 made non-conductive by the control voltage, there will be included in series in the output circuit of the amplifier 20 a circuit element of high impedance.

Assuming again the condition of conduction by bridge 21 at the same time that the upper terminal of amplifier 20 is positive, the output voltage of amplifier 20 will increase the current flow through the lower left-hand diode and will decrease the current flow from transformer 22 through the upper left-hand diode. Similarly and concurrently, the output voltage of amplifier 20 increases the current flow through the upper right-hand diode and decreases the current flow through the lower right-hand diode. The result is an output current from bridge 21 so long as the instantaneous polarities remain as assumed, the output current flow being by way of conductor 25 with return thereof by way of output conductor 24. Stating the operation differently and from the standpoint of the amplifier, with the polarities as assumed above, the rectifier 21 appears as a low impedance element with flow of current from the amplifier 20 by way of the output conductors 24 and 25.

The foregoing action is assured under all conditions of operation by providing at the secondary winding of transformer 22 an output voltage, the peak values of which always materially exceed those of the alternating-current voltage of amplifier 20.

At the end of corresponding half-cycles, the polarities at both the secondary winding of transformer 22 and at the amplifier 20 will reverse, and no current will flow through the output circuit 24, 25 for the duration of the succeeding half-cycle because bridge 21 has been made non-conductive by the control voltage.

It will now be assumed that the left-hand side of the secondary winding of transformer 22 is again positive and also that the phase of the output voltage of amplifier 20 has reversed, i.e., so that its lower terminal is now positive with the upper terminal negative. As described above, the rectifier 21 will be turned on or rendered conductive by the control voltage. The output voltage of amplifier 20 is now effective to increase the current through the lower right-hand diode and also through the upper left-hand diode with concurrent decrease in current flow through the lower left-hand diode and the upper right-hand diode. The result is flow of current through bridge 21 from right to left, a direction of flow opposite to that described above. Thus, the polarity of the direct-current output voltage reverses with reversal of phase of the voltage of amplifier 20 relative to the voltage at the secondary winding of transformer 22.

The direct-current output from amplifier 20 is applied by output conductors 24 and 25 to a filter which includes as an input resistor the resistance of the output circuit. The filtering circuit also includes capacitors 26 and 27 and a resistor 28. The filtered direct-current output is applied by way of a voltage divider comprising resistor 30 and output resistors 31 and 32 to one or more output circuits, two being shown connected across output resistors 31 and 32.

The potential developed across resistor 30 is applied by way of a compensating network having lead characteristics and including a capacitor 33 and resistor 34 to range resistors 36 and 37. The negative feedback voltage for the amplifying system 10 is derived from the range resistors 36 and 37. This negative feedback voltage is by a single-pole, double-throw vibrator converted to alternating current. The alternating current is applied to the primary winding 41*p* of a transformer 41. One side of primary winding 41*p* is connected to the single pole 19*p*, and the other side of that winding is connected between the range resistors 36 and 37.

The pole 18*p* of the first-described or input converter is connected to one side of the secondary winding 41*s* of transformer 41. The other side of that secondary winding is connected through a capacitor 42 to one side of the input circuit.

The two converters may be provided by a double-pole, double-throw converter 18, such as shown in Fig. 1C.

The manner in which the converter 18 and the associated circuits develop through the transformer 41 a direct-current feed-back voltage in the input circuit can be readily understood by first assuming that the single poles 18*p* and 19*p* are in their illustrated positions.

With pole 18*p* in its left-hand position engaging contact 18*a*, the primary winding 16*p* of transformer 16 is effectively disconnected from the input circuit. There is completed a circuit for the secondary winding 41*s* of transformer 41 which extends through the capacitor 42 and to the left-hand double-throw contact 18*a* of the input converter.

With single-pole contact 19*p* in its lower-most position in engagement with contact 19*a*, current will flow through the primary winding 41*p* and thus induce current flow in secondary winding 41*s* to charge the capacitor 42. It will be assumed that the output current in secondary winding 41*s* charges capacitor 42 so that the right-hand side thereof will be positive. The capacitor 42 will be charged to the voltage developed across range resistor 37. In order that the voltage appearing across capacitor 42 will be equal to the potential difference across range resistor 37, the transformer 41 is designed so that the voltage across the secondary winding 41*s* will be equal in amplitude to the voltage applied to the primary winding. This implies, of course, a one-to-one voltage ratio for the transformer 41. As shown in Fig. 1A, the voltage developed across capacitor 42 has been illustrated by the positive-going rectangular voltage pulse 37*v*. The transformer 41 may have a voltage ratio other than unity and as may be desired for particular applications.

The converter 18 thereafter operates the poles 18*p* and 19*p* from their illustrated positions to their opposite positions. The arrangement is such that the single pole 19*p* arrives at its uppermost circuit-closing position in engagement with contact 19*b* ahead of the time that the pole 18*p* arrives at its right-hand position in engagement with contact 18*b*. The contact 18*p* always opens its associated circuits ahead of the time contact 19*p* opens its associated circuits. Stated differently, the open time for the input converter including pole 18*p* is greater than the open time for the feedback converter including pole 19*p*. The former may have 65% open time and the latter 55% open time.

At the instant pole 19p completes the circuit through its uppermost contact 19b, current flows due to the potential difference across range resistor 36. However, the current flow through the primary winding 41p is in a direction opposite to that when that winding was connected across range resistor 37. This negative-going current is due to the negative-going voltage derived from range resistor 36 as illustrated at 36v, Fig. 1A. Accordingly, the resultant potential developed in the secondary winding 41s will likewise be of opposite polarity to what it was when connected through the transformer to the range resistor 37.

With respect to the capacitor 42, the polarity of the induced voltage across secondary winding 41s with pole 19p in its uppermost position will be in series-aiding relation to the potential difference of capacitor 42. Thus, the potential difference or feedback voltage applied to the input circuit, as illustrated in Fig. 1B, will be made up of the potential difference 42v of capacitor 42 (equal to 37v in magnitude) added to the potential difference 36v as appearing across secondary winding 41s. The sum of these two potentials comprises the feedback voltage introduced into the input circuit each time the pole 18p engages contact 18b.

While the voltage-adding effect is characteristic of the system of Fig. 1, from the standpoint of the operation as a whole, it is important to observe that the feedback voltage is representative of the peak-to-peak values of the alternating current made up of half-cycles 36v and 37v of Fig. 1A. The utilization of the peak-to-peak voltage is considered an important feature of the invention since it plays an important part in making the feedback voltage independent of non-symmetrical differences in converter contact time, particularly of pole 19p.

By reason of the provision of a greater percent open time for the input converter including pole 18p relative to the feedback converter including pole 19p, it is assured that the magnitude of the feedback voltage, as illustrated in Fig. 1B, will at all times be representative of the peak-to-peak voltages illustrated in Fig. 1A. This result is achieved by reason of the fact the pole 19p always engages stationary contacts 19a and 19b ahead of the time that the pole 18p engages its corresponding stationary contacts 18a and 18b. By the differential in time of operations as between the poles 18p and 19p, the voltage pulses as appearing across the secondary winding 41s always attain their maximum value at or prior to the time pole 18p engages the feedback contact 18b.

In addition to the foregoing differential as between the on-time for the input and feedback converters, it is desirable that the transformer 41 shall have a long time constant. With a long time constant, that transformer will for a time interval maintain the output pulse 36v at secondary winding 41s at its peak value which, as explained above, will then be made effective in the input circuit. A time constant for the transformer of about one-quarter of a second has been found satisfactory as a lower value. It is preferably higher, of the order of four-tenths of a second and above. The capacitor 42 is of low leakage type, that is to say, a high quality capacitor capable of receiving and holding over a period of time the charge received from the secondary winding 41s.

The alternating-current voltage applied to the primary winding 41p will be of the square wave type, as shown in Fig. 1A. In order to assure that the induced voltage on secondary winding 41s has attained its maximum value after movement of pole 19p to its uppermost position engaging contact 19b, there is provided a short delay after pole 19p engages contact 19b and before pole 18p engages contact 18b. With contact 18p in its right-hand position engaging contact 18b, any difference between the sum of the voltages (the voltage across capacitor 42 plus the voltage across secondary winding 41s) and the voltage or potential difference developed by thermocouple 11 on the input circuit causes a current to flow in the primary winding 16p of transformer 16. Thus, the operation of the poles 18p and 19p at 60 cycles per second not only produces the alternating-current input signal for amplifier 20, but it also provides the negative feed back direct-current potential for the input circuit.

From the foregoing, it will be seen that the output circuits taken across resistors 31 and 32 are wholly isolated from the input circuit including thermocouple 11. There has been avoided entirely the possibility of any circulating currents in the output circuit which can affect the input circuit, and particularly the negative feedback signal applied thereto. The resistors 31 and 32 are representative of the resistance of each load to be connected to the amplifying system 10. Ordinarily, one of the output terminals will be at ground potential. Where there are two loads, as represented by load resistors 31 and 32, the ground connection may be common to both of them, as illustrated by the solid line connection to ground. Sometimes, however, it may be desirable to apply the ground connection to one or the other of the points indicated by the broken line connections extending to ground. By reason of the isolation of the input circuit from the output circuit, ground connections at any location, or when omitted, on either circuit do not affect the operation of the amplifier. A ground may be applied at any point in the output circuit without affecting the direct-current feedback from the output circuit to the input circuit of the amplifying system.

Reference was made above to the compensating circuit including capacitor 33 and resistor 34. This introduces an advance or lead in the current relative to the voltage introduced by the filter including capacitors 26 and 27 and their associated resistors. Further to compensate for the lag so introduced, it has been found desirable to include a capacitor 44 connected across the load resistors 31 and 32 to form therewith a further compensating circuit of the leading type. Though not necessary, it is desirable to include a capacitor 45 connected between the output of the filtering network to ground.

As illustrative and not by way of limitation, in a particular embodiment of the invention the various circuit components had the values appearing in the following table, the resistance of the rectifier 21 and the output circuit of the amplifier 20 being of the order of 1200 ohms:

*Table I*

| | |
|---|---|
| Capacitor **26** | 2,000 microfarads. |
| Capacitor **27** | 400 microfarads. |
| Capacitor **33** | 2 microfarads. |
| Capacitor **44** | 100 microfarads. |
| Capacitor **42** | 8 microfarads. |
| Resistor **28** | 1,000 ohms. |
| Precision resistor **34** | 38,000 ohms. |
| Precision resistor **30** | 600 ohms. |
| Precision resistor **36** | Variable between 50–500 ohms. |
| Precision resistor **37** | Variable between 50–500 ohms. |

The sum of the load resistances 31 and 32 is of the order of 2,500 ohms.

The input filter from thermocouple 11 is conventional. It may be of the multiple-section type, only two sections of which have been shown, each section including capacitors 14 and 15 of 8 microfarads each, and each resistor section, such as resistors 12 and 13, being 2,200 ohms.

In the above description, reference has been made to the single-pole, double-throw input and feedback converters. The phrase "single-pole, double-throw" is well understood by those skilled in the art to describe the electrical functions performed, and as schematically illustrated in Fig. 1.

In Fig. 1C a double-pole synchronous converter 18 of the type disclosed in Williams et al. Patent 2,614,188 is schematically illustrated, the converter of that patent being illustrated in Fig. 1C as including both the input and feedback converters. They are illustrated as of the normally open-circuit type.

In Fig. 1C the pole 18*p* of Fig. 1 comprises a pair of contacts 18'*p* and 18''*p* which are stationary relative to contacts 18*a* and 18*b*. By providing a reed 47 operable by the coil 18*c*, the contact 18*a* opens the circuit through contact 18'*p* and the contact 18*b* closes the circuit through contact 18''*p* each time the reed 47 moves to the left from its right-most position. The time interval during which the circuit through contact 18*a* is open is relatively long. As the reed 47 moves from its left-most position to the right, the circuit through contacts 18*b* and 18''*p* is opened. Thereafter, the circuit through contacts 18*a* and 18'*p* closes. The circuit through contacts 18*b* and 18''*p* remains open for an equally long period and until the reed 47 has completed its excursion to the right and has partly returned to its left-most position.

The foregoing operation is schematically illustrated by the timing diagrams 18'*a* and 18'*b* of Fig. 1D. Thus, for an initial period, say 7½% of a cycle, the circuit through contacts 18*a* and 18'*p* is open; the circuit then closes and remains closed for a substantial period of time, say 35% of a cycle. The circuit through contact 18*a* is then opened and remains open for a substantial length of time, as for example, 57½% of the cycle. Thus the circuit through the converter contacts 18*a*, 18'*p* is open for 65% of a cycle.

As explained above, the closure time of the circuit through contacts 18*a* and 18'*p* occurs during a half-cycle while the closure time for the circuit through contacts 18*b*, 18''*p* occurs during the next half-cycle. The adjustment of the stops formed by screws 49 and 50 is such that the open and closed times of the respective circuits through the contacts 18*a* and 18*b* can be made equal.

In order that the open time of the right-hand converter of Fig. 1C shall be less than that of the left-hand converter, the stops formed by the adjusting screws 51 and 52 are positioned to decrease the spacing between the associated contacts with the converter at rest, the illustrated position. With this decreased spacing, it will be seen from the timing diagrams 19'*a* and 19'*b* that the circuit through contacts 19*a* and 19'*p* closes ahead of the circuit through contacts 18*a* and 18'*p* and remains closed for a longer time. The circuit through contacts 19*a* and 19'*p* is not opened until after the circuit has been opened through contacts 18*a* and 18'*p*. For example, in timing diagram 19'*a*, the circuit through 19*a* and 19'*p*, may for a half-cycle first be open 2½% of the time of a cycle, then closed for 45% and then open for 52½% of the cycle. Thus the right-hand converter of Fig. 1C may be described as having an open time of 55%.

The functions performed by the embodiment of converter 18 of Fig. 1C are precisely the same as those of converter 18 of Fig. 1. It may here be observed that instead of connecting together the contacts 18'*p* and 18''*p* as by conductor 48, the contacts 18*a* and 18*b* could be connected together with corresponding changes in their associated circuits. If this were done, the input converter of Fig. 1C would schematically appear closer to the arrangement illustrated in Fig. 1, though the operation would be identical with that just described.

In the embodiment of the invention of Fig. 1, the input circuit connected to the input of the amplifier 20 is of the high impedance type. It has a high impedance by reason of the relatively large percentage of open time for the converter including pole 18*p* and also by reason of the resistance values for resistors 12 and 13. A high impedance input circuit is quite satisfactory for amplifiers of the vacuum tube type. However, low impedance input circuits will sometimes be preferred. They may be utilized with vacuum tube amplifiers adapted for operation with low impedance input circuits and, in general, the low impedance input circuit will be preferred for amplifiers of the transistor type.

We have illustrated in Fig. 2 a modification of our invention; more particularly, an amplifying system embodying the principles of our invention and including circuit changes which, among other things, provide a low impedance input circuit for the amplifier 20*a*. These circuit changes including the full wave rectifier for the feedback signal are not part of our invention though the principal features of our invention have been included therein.

In Fig. 2 the amplifier 20*a* is identical in function with amplifier 20 of Fig. 1 except that the former may be of the low impedance type, such as is common in transistor amplifiers. The output circuit of amplifier 20*a* is connected to the rectifying means 21, shown only in Fig. 1, and thence through the additional circuitry of Fig. 1 to range resistors 36*a* and 37*a*. Corresponding points in the output circuit of Figs. 1 and 2 have been marked respectively *a* and *b*. Assuming again a 1:1 voltage ratio for transformer 41, the range resistors 36*a* and 37*a* will have values twice those of resistors 36 and 37 since the voltage-adding feature is not utilized in Fig. 2.

In Fig. 2 there is utilized the input converter including pole 18*p* to provide full-wave rectification of the alternating current appearing across a pair of secondary windings 41*a* and 41*b* of transformer 41. One side of winding 41*a* is connected to the contact 18*a*, and one side of the winding 41*b* is connected to the contact 18*b*. The other side of winding 41*a* is connected to one side of a first primary winding 16*a* of transformer 16, and the other side of secondary winding 41*b* is connected to one side of a second primary winding 16*b* of transformer 16. Windings 16*a* and 16*b* have corresponding sides connected together and form one side of the input circuit from the thermocouple 11 by way of the input filter. The other side of the input circuit is connected through resistor 58 to the pole 18*p* illustrated in a position completing a circuit through contact 18*a*.

The pole 19*p* is also illustrated in a position to complete a circuit through its contact 19*a*. Thus, the pole 19*p* operates in the same manner as Fig. 1, applying a voltage, of one polarity when in contact with contact 19*a* and then of the opposite polarity when in contact with 19*b*, to the primary winding 41*p* to produce an alternating-current output at the secondary windings.

In Fig. 2 the phasing is such that a voltage pulse applied to the primary winding 41*p* induces in secondary winding 41*a* a voltage pulse 42*v* opposing that of thermocouple 11 in the input circuit. When the pole 18*p* has been moved to engage contact 18*b* a short time interval after pole 19*p* has been moved to engage contact 19*b*, a voltage 43*v* produced across the secondary winding 41*b* is introduced into the input circuit and by reason of the reversed connections of winding 41*b* as compared with winding 41*a*, is of opposite polarity to that of the thermocouple 11 to oppose the latter's unidirectional potential difference in the input circuit. Any difference between the voltage of thermocouple 11 and the voltages induced in the secondary windings 41*a* and 41*b* will cause current flow through the windings 16*a* and 16*b* for producing an alternating-current input to the amplifier 20*a*. That current will first flow through winding 16*a* in one direction and then through winding 16*b* in an opposite direction. The result at the secondary winding 16*s* is the development of an alternating-current voltage applied to the input of the amplifier 20*a*.

The differential in open time as between the two converters is present in the modification of Fig. 2. Thus the circuits completed by the pole 18*p* through the respective contacts 18*a* and 18*b* are open for longer periods of time than the circuits completed by the pole 19p. While the circuits completed by pole 18p are open, say for 65% of the time, it is to be observed that the input circuit to the amplifier 20a is not open for the same percentage of time of each cycle as in the modification of Fig. 1. With the assumed 65% open time, the input circuit to amplifier 20 of Fig. 1 is open 65% of the time of each cycle. In the modification of Fig. 2 that input circuit will be open but 30% of the time of each cycle. This will be self-evident by noting that in the modification of Fig. 1 when the pole 18p is in its left-most position, the input circuit to amplifier 20 is open, while in Fig. 2 when pole 18p is in its left-most position, the input circuit to amplifier 20a is closed. By reason of the foregoing, including the provision of the full-wave rectifier circuits traced entirely by way of the transformer windings, it will be seen that the input circuit is of the low impedance type and well adapted to the requirements of a transistor amplifier. The windings of the transformer may for the low impedance circuit have relatively low values of direct-current resistance. They will have such low values for low impedance type of amplifiers. However, they can have higher values of resistance when the circuit of Fig. 2 is utilized in conjunction with a high impedance type of amplifier.

It has been found that with a transistor amplifier, as symbolically illustrated at 20a, the direct-current resistance of the windings of transformer 41 may be of the order of 900 ohms each, with a direct-current resistance of the primary windings 16a and 16b of transformer 16 of the order of 200 ohms each. The input filter will include resistors of the order of 600 ohms each and capacitors each having capacitances of about 25 microfarads. With these changes, the same filtering action as in Fig. 1 is obtained. The transformer 16 in Fig. 2 has a ratio of one-to-two as between each half of the primary relative to the secondary. This provides the desired impedance-matching characteristics for the transistor amplifier 20a whose input circuit may have an input impedance of 14,000 ohms, the secondary winding 16s having a direct current resistance value of the order of 1700 ohms. The arrangement of Fig. 2 provides an optimum signal-to-noise ratio for the input circuit of the amplifier 20a.

In the system of Fig. 1 the range resistors 36 and 37, and corresponding range resistors 36a and 37a of Fig. 2, have been illustrated as adjustable. They are made adjustable in order that the feedback voltage introduced into the input circuit for a desired output signal will be of the proper value to oppose the voltage developed by the thermocouple 11. Thus, different thermocouples may be included in the input circuit for determining temperatures of different range. The range resistors 36a and 37a will be adjusted so that when the feedback voltage is equal to the voltage developed by the thermocouple connected into the input circuit, there will be produced the desired output signal.

The thermocouple 11 has been illustrated as a simple voltage input device. The present invention lends itself to the measurement of any unknown voltages developed by condition-sensitive devices which produce output voltages varying with changes in the magnitude of a condition. Such devices may include current-responsive elements which produce output voltages varying with change of current therethrough.

In Fig. 2 there has been added the block 55 which is to be taken symbolically to represent reference junction compensation for the thermocouple 11 and, as further illustrated, a zero suppression circuit shown as including a battery 56, a rheostat 57, and a resistor 58 connected in series in the input circuit. With the contact of the rheostat 57 in a position to interrupt the circuit through the battery, no potential difference will appear across the resistor 58 in the input circuit. This is the situation which has been assumed in the foregoing description of Fig. 2. Accordingly, the current in the output circuit, with proper adjustment of range resistors 36a and 37a, varies from zero to a maximum, generally from zero to five milliamperes. Where it is desired to have the output current vary from a predetermined minimum value to a maximum value, as between one milliampere to five milliamperes, the contact of rheostat 57 will be moved to complete a circuit from battery 56 for flow of current through the resistor 58. The range resistors 36a and 37a will then be adjusted so that for zero input from thermocouple 11, there will be exact compensation for the potential difference developed across resistor 58 by flow of current in the output circuit of the selected minimum magnitude, the foregoing one milliampere.

The foregoing is an illustration of the flexibility of the present system in its use in measuring systems. Reference compensation circuits which have not been illustrated are of conventional type and the manner of introducing a potential difference across resistor 58 from battery 56 is to be taken as a diagrammatic illustration of the more refined type which will ordinarily be used as, for example, a stabilized source of direct-current supply, such as disclosed in Amey et al. Patent 2,830,252.

What is claimed is:

1. An amplifying system comprising an alternating-current amplifier having a direct-current input circuit and an output circuit including rectifying means for producing a direct-current output signal, an input transformer with primary and secondary windings, said primary winding forming part of said direct-current input circuit, a feedback transformer having primary and secondary windings, means including an input converter in said input circuit for transforming a direct-current input voltage into an alternating-current input voltage for said alternating-current amplifier and in conjunction with said secondary winding of said feedback transformer converting to a direct-current voltage an alternating-current voltage applied to the primary winding thereof, and means connected to said output circuit and including a feedback converter operating synchronously with said input converter for producing from the direct-current output signal from said alternating-current amplifier said alternating-current voltage applied to said primary winding of said feedback transformer.

2. The amplifying system of claim 1 in which said input converter functions as a half-wave rectifying means, and voltage-adding means comprising a capacitor connected in series with the secondary winding of said feedback transformer for adding voltages developed across said capacitor by half-cycles of one polarity in series-aiding relation to the half-cycles of opposite polarity, the sum of said voltages being introduced into said input circuit in opposition to the direct-current input voltage thereof.

3. The amplifying system of claim 1 in which said input converter is of the single-pole, double-throw type, the pole thereof being connected to one side of the secondary winding of said feedback transformer, one contact of said converter being connected through a capacitor to the other side of said secondary winding, the respective contacts of said input converter being connected in series in said direct-current input circuit for developing across said capacitor voltages of magnitude corresponding with the peak voltages of corresponding half-cycles of said alternating-current and for adding said voltages of said capacitor in series-aiding relation with voltages developed across said secondary winding by half-cycles of said opposite polarity.

4. The amplifying system of claim 3 in which there is provided a pair of range resistors for controlling the magnitude of the direct-current voltage applied by way of said feedback converter to the primary winding of said feedback transformer relative to said direct current output signal.

5. The amplifying system of claim 1 in which said input converter and said feedback converter are respectively of the single-pole, double-throw type, said feedback converter having a closed time greater than the closed time of said input converter.

6. The amplifying system of claim 1 in which said direct-current input circuit has a voltage-developing means therein for producing a fixed voltage of selected magnitude, thereby to predetermine the magnitude of current flowing in said direct-current feedback circuit for zero input voltage applied to said direct-current input circuit.

7. An amplifying system comprising an alternating-current amplifier having an input transformer with primary and secondary windings, said primary winding forming part of a direct-current input circuit, a converter included in said direct-current input circuit for transforming a direct-current input voltage into an alternating-current input potential for said alternating-current amplifier, rectifying means for converting the alternating-current output of said amplifier into a direct-current signal, a second converter operating synchronously with said first-named converter for transforming said direct-current signal into an alternating-current signal, and means including a feedback coupling transformer having a primary winding to which said alternating-current signal is applied and having a secondary winding connectible by said first-named converter in series in said direct-current input circuit for developing in that circuit a direct-current potential opposing said direct-current input potential and of magnitude independent of non-symmetrical differences in the contact time of said converters.

8. The amplifying system of claim 7 in which said second converter is of the single-pole, double-throw type, one side of the primary winding of said feedback transformer being connected to the single-pole of said second converter, a pair of precision resistors connected to the double-throw contacts, and a connection from the other side of said primary winding of said feedback transformer to a point intermediate said resistors.

9. The amplifying system of claim 8 in which said secondary winding of said feedback transformer has in series-circuit relation therewith a capacitor.

10. The amplifying system of claim 9 in which said first-named converter is of the single-pole, double-throw type, said secondary winding of said feedback transformer being connected to said single pole, said capacitor having one side connected to one of the double-throw contacts, and one side of the primary winding of said input transformer being connected to the other of said double-throw contacts.

11. A direct-current feedback amplifying system comprising input converting means, means for applying a direct-current input signal to said input converting means for conversion of said direct-current input signal to an alternating-current signal, an alternating-current amplifier responsive to the output from said input converting means and including a non-conductive coupling element for direct-current isolation, rectifier means connected to the output of said alternating-current amplifier for converting the amplified alternating-current signal to a direct-current output signal, feedback means for developing from said output signal a direct-current feedback signal, feedback converting means for converting said direct-current feedback signal to an alternating-current feedback signal, and a second non-conductive coupling element coupled between said feedback converting means and said input converting means for application of said alternating-current feedback signal to said input converting means for converting said alternating-current feedback signal to a direct-current signal opposing said input signal.

12. An amplifying system comprising an alternating-current amplifier having a direct-current input circuit and a direct-current output circuit, an input transformer with primary and secondary windings, said primary winding forming part of said input circuit, a feedback transformer having primary and secondary windings, the latter forming part of said input circuit, means including an input converter in said input circuit for applying an alternating-current input voltage to said alternating-current amplifier, and in conjunction with said feedback transformer converting to a direct-current voltage an alternating-current voltage applied to said primary winding thereof, and means connected to said output circuit and including a feedback converter operating synchronously with said input converter for converting the direct-current output from said amplifier to said alternating-current voltage applied to said primary winding of said feedback transformer.

13. The amplifying system of claim 12 in which said means including said input converter in said input circuit develops from half-cycles of opposite polarity said direct-current voltage.

14. The amplifying system of claim 12 in which said input converter and said feedback converter are respectively of the single-pole, double-throw type, said feedback converter having an open time less than the open time of said input converter.

No references cited.

UNITED STATES PATENT OFFICE
CERTIFICATE OF CORRECTION

Patent No. 2,901,563 August 25, 1959

Will McAdam et al.

It is hereby certified that error appears in the printed specification of the above numbered patent requiring correction and that the said Letters Patent should read as corrected below.

Column 6, line 34, after "voltage" insert -- in order to compensate for the lag of the current relative to the voltage --; column 11, line 23, for "signnal" read -- signal --.

Signed and sealed this 9th day of August 1960.

(SEAL)
Attest:

KARL H. AXLINE
Attesting Officer

ROBERT C. WATSON
Commissioner of Patents